United States Patent [19]

Gonsalves

[11] Patent Number: 4,803,955
[45] Date of Patent: Feb. 14, 1989

[54] MILK CALF FEEDING SYSTEM WITH AUTOMATIC CLEANING CYCLE

[76] Inventor: Patrick Gonsalves, 3636 Monte Vista, Ceres, Calif. 95307

[21] Appl. No.: 36,905

[22] Filed: Apr. 9, 1987

[51] Int. Cl.$^4$ ............................................... A01K 9/00
[52] U.S. Cl. .................................... 119/71; 222/146.1
[58] Field of Search ................... 119/51.11, 51.5, 71; 62/177, 178; 222/146.1; 134/95

[56] References Cited

U.S. PATENT DOCUMENTS

| | | | |
|---|---|---|---|
| 2,328,110 | 8/1943 | Thompson et al. | 222/146.1 X |
| 2,440,406 | 4/1948 | Kerr | 222/146.1 X |
| 2,458,230 | 1/1949 | Warcup . | |
| 2,591,985 | 4/1952 | Warcup . | |
| 2,770,248 | 11/1956 | Audia . | |
| 3,037,481 | 6/1962 | Kloss | 119/71 |
| 3,157,210 | 11/1964 | Palma . | |
| 3,208,431 | 9/1965 | Kloss | 119/51.5 X |
| 3,307,521 | 3/1967 | Tavera et al. | 119/71 |
| 3,338,153 | 8/1967 | Holstein . | |
| 3,425,398 | 2/1969 | Buffy et al. | 119/51.11 |
| 3,524,432 | 8/1970 | Tartar | 119/51.11 |
| 3,898,861 | 8/1975 | McMillin | 62/177 |
| 4,061,504 | 12/1977 | Zall | 134/95 |
| 4,653,432 | 3/1987 | Smeds | 119/71 |

*Primary Examiner*—Robert P. Swiatek
*Attorney, Agent, or Firm*—Fleit, Jacobson, Cohn & Price

[57] ABSTRACT

A liquid nutrient feeding system is provided including a first large volume receptacle for containing a bulk supply of liquid nutrient and a small volume liquid nutrient tank disposed below the receptacle. First conduit structure is provided for gravity feeding liquid nutrient from the receptacle to the small volume tank and nipple structure is disposed below the level of the small volme tank and communicated therewith by second conduit structure for gravity feed of liquid nutrient from the small volume tank to the nipple structure. Liquid nutrient level sensing structure is operatively associated with the small volume tank for admitting liquid nutrient thereinto from the receptacle only to a predetermined level in the small volume tank, whereby to provide a substantially constant head pressure of liquid nutrient in the second conduit structure to the nipple structure. Heating structure is operatively associated with the first conduit structure for heating the flow of liquid nutrient therethrough and structure is provided whereby the receptacle and tank and the first and second conduit structure initially may be flushed clean of liquid nutrient after depletion of liquid nutrient in the small volume tank and thereafter may be flushed with a cleaning and sanitizing liquid prior to introduction of a new supply of liquid nutrient in the receptacle.

14 Claims, 3 Drawing Sheets

MILK CALF FEEDING SYSTEM WITH AUTOMATIC CLEANING CYCLE

BACKGROUND OF THE INVENTION

1. Field of the Invention

This invention relates to a fully automated electro-mechanical "milk" calf feeding system into which chilled nutrient supplemented milk may be placed in bulk quantity and from which calves may receive warmed milk from teat simulating nipples at any time they feel the need for feeding. This sytem incorporates timed automatic cleaning facilities whereby the entire system may be automatically cleaned after consumption of each bulk quantity of nutrient supplemented milk supplied thereto.

2. Description of Related Art

Various different forms of beverage and animal liquid nutrient dispensing systems including some of the general structural and operational features of the instant invention heretofore have been provided. Examples of systems of this type are disclosed in U.S. Pat. Nos. 2,458,230, 2,591,985, 2,770,248, 3,037,481, 3,157,210, 3,338,153, 3,898,861 and 4,061,504. However, the animal feeding system of the instant invention includes a combination of structural features which is not disclosed by the above noted prior art and which results in advantages of operation in the field of young animal feeding.

SUMMARY OF THE INVENTION

The feeding system of the instant invention utilizes a large volume cooled or refrigerated receptacle for receiving a bulk quantity of nutrient supplemented milk and a warming tank is disposed therebelow and includes a heat exchanger therein as well as a small supply tank. A hot tank is disposed alongside the warming tank and has heating means operatively associated therewith and solenoid valve controlled flow lines communicate upper and lower portions of the warming and hot tanks. Milk flows by gravity from the receptacle through the heat exchanger in the warming tank to the supply tank through a float controlled valve and subsequently from the supply tank to a plurality of nursing nipples disposed at proper elevation for feeding "milk" calves. The liquid level controlling float valve for the supply tank insures a substantially constant head pressure of milk to the nipples and as additional heat is required in the warming tank, heated liquid in the hot tank is allowed to circulate, by convection, through the warming tank. In addition, the warming tank also includes a thermostatically controlled electric heater.

The feeding system utilizes a warming liquid such as water in good heat exchange relation with the nutrient supplemented milk and the water containing portions of the system are communicated with a supply of water under pressure through flow controlling solenoid actuated valves. In addition, the system includes self-cleaning structure whereby cool rinsing water may be introduced into the milk containing portions of the system, circulated therethrough and dumped therefrom. Thereafter, a supply of heated water having a sanitizing agent added thereto may be passed through the milk handling components of the feeding system for sanitation thereof before also being dumped from the system.

The main object of this invention is to provide a feeding system by which nutrient supplemented milk may be fed to calves or other domestic animals at the suckling age.

Another object of this invention is to provide an automatic animal feeding system into which a bulk quantity of chilled milk may be introduced and which will gradually feed warm milk from the bulk supply thereof to a warm supply tank from which warmed milk may be directly discharged to nipples for consumption by suckling animals.

A further object of this invention is to provide a feeding system which will enable suckling animals to receive nutrient supplemented and warm milk at any time of the day or night.

Yet another object of this invention is to provide a feeding system in accordance with the preceding objects and which includes automatic cleaning structure enabling the system to be automatically cleaned and sanitized after the supply of bulk milk has been consumed.

Another object of this invention is to provide a feeding system including an automatic cleaning cycle that will automatically signal that the feeding system is again ready to receive a further bulk supply of milk therein after the cleaning cycle has been completed.

Another very important object of this invention is to provide a feeding system incorporating a novel and effective way to maintain the temperature of the milk being supplied to the nipples of the feeding system at a predetermined temperature to therefore enable suckling animals to receive nutrient supplemented milk in a manner promoting maximum health, happiness and growth of the animals being fed.

Yet another object of this invention is to provide a feeding system which may utilize either a refrigerated bulk supply tank or a non-refrigerated bulk supply tank in which milk containing a vitamin-mineral fortified stayfresh formula may be stored at ambient temperatures.

A final object of this invention to be specifically enumerated herein is to provide a suckling animal feeding system in accordance with the preceding objects and which will conform to conventional forms of manufacture, be of simple construction and easy to use so as to provide a device which will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
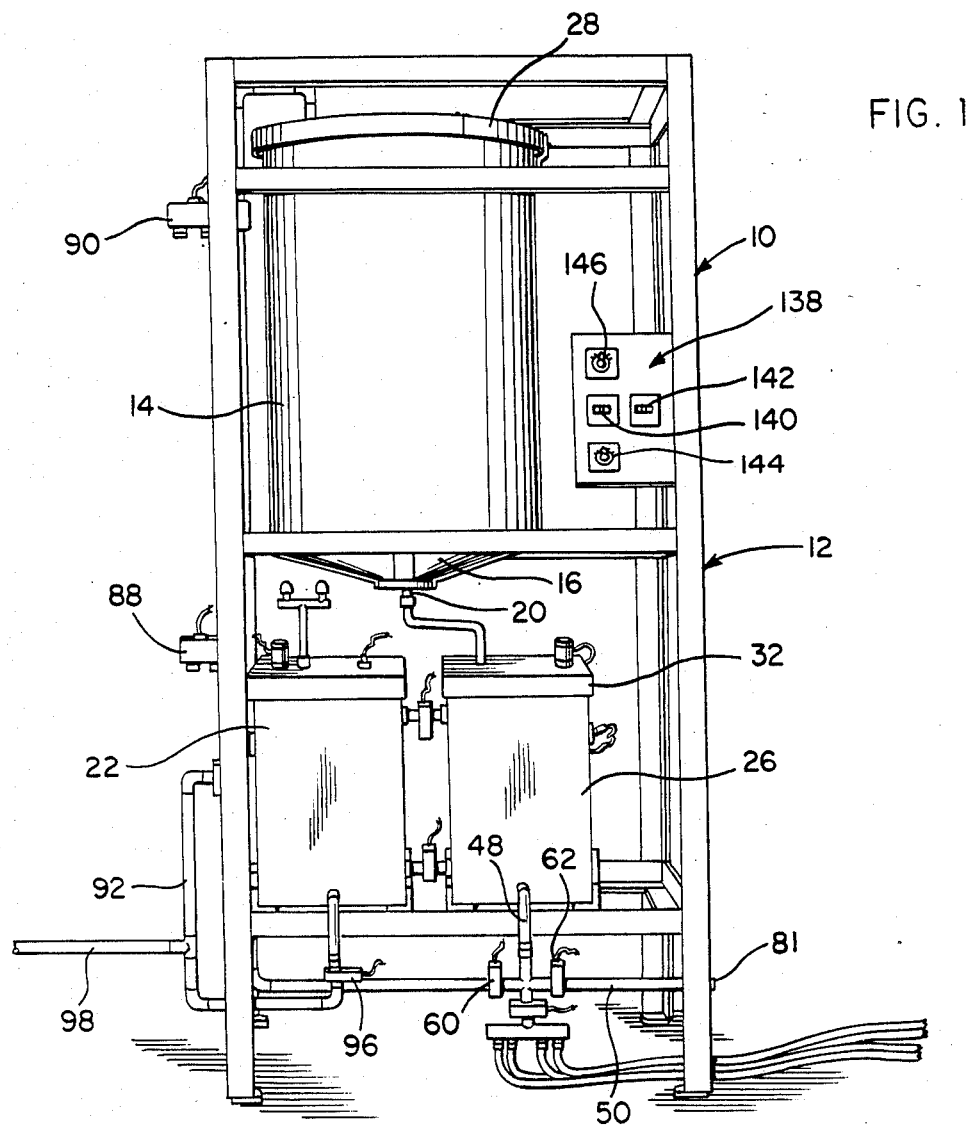
FIG. 1 is a front elevational view of a suckling animal feeding system constructed in accordance with the present invention.
Figure 3:
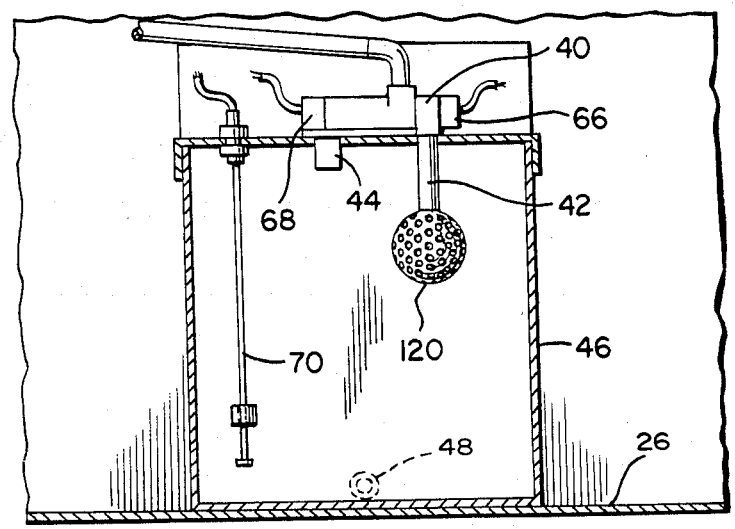
FIG. 3 is an enlarged fragmentary vertical sectional view illustrating the interior structures of the small volume nipple milk supply tank contained within the milk warming tank.
Figure 2:
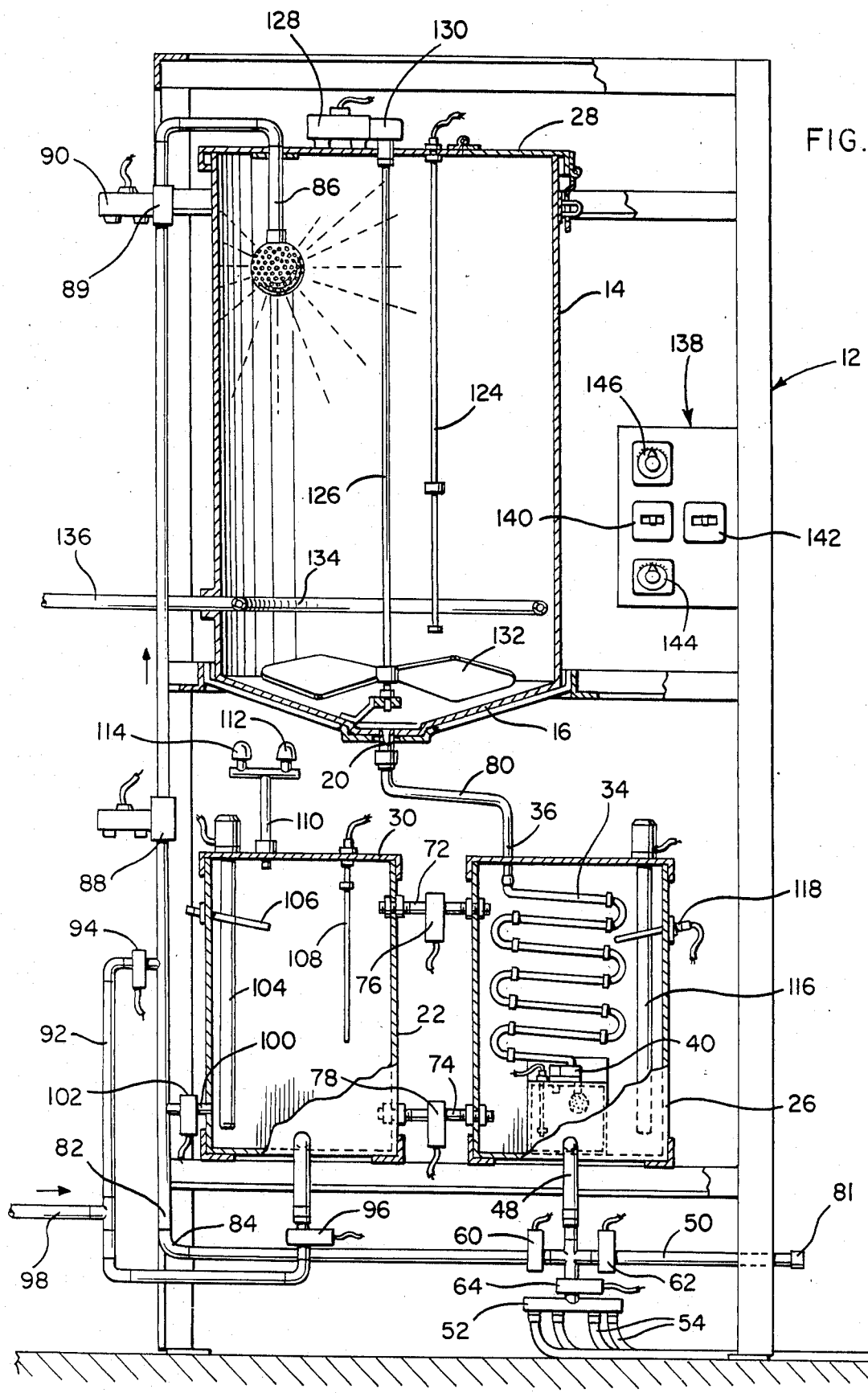
FIG. 2 is an enlarged front elevational view of the feeding system with portions of the heating liquid and milk handling components thereof broken away and illustrated in vertical section.
Figure 4:
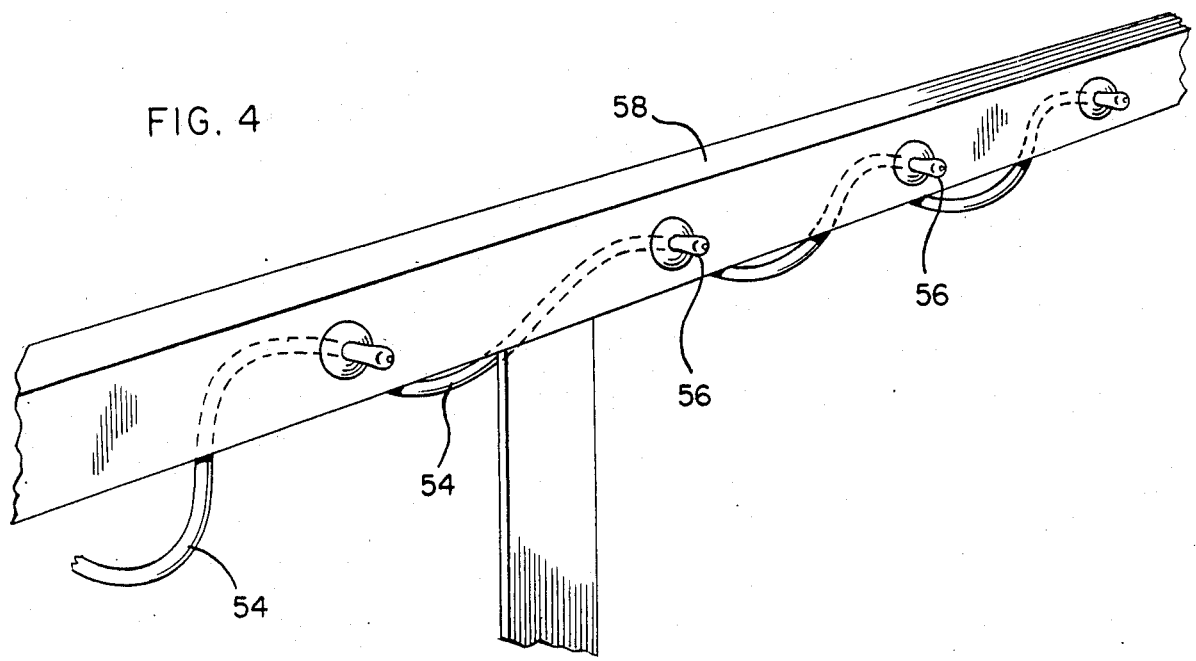
FIG. 4 is a fragmentary perspective view illustrating the manner in which a plurality of nipples may be supported from a horizontal support at a predetermined elevation.
Figure 5:
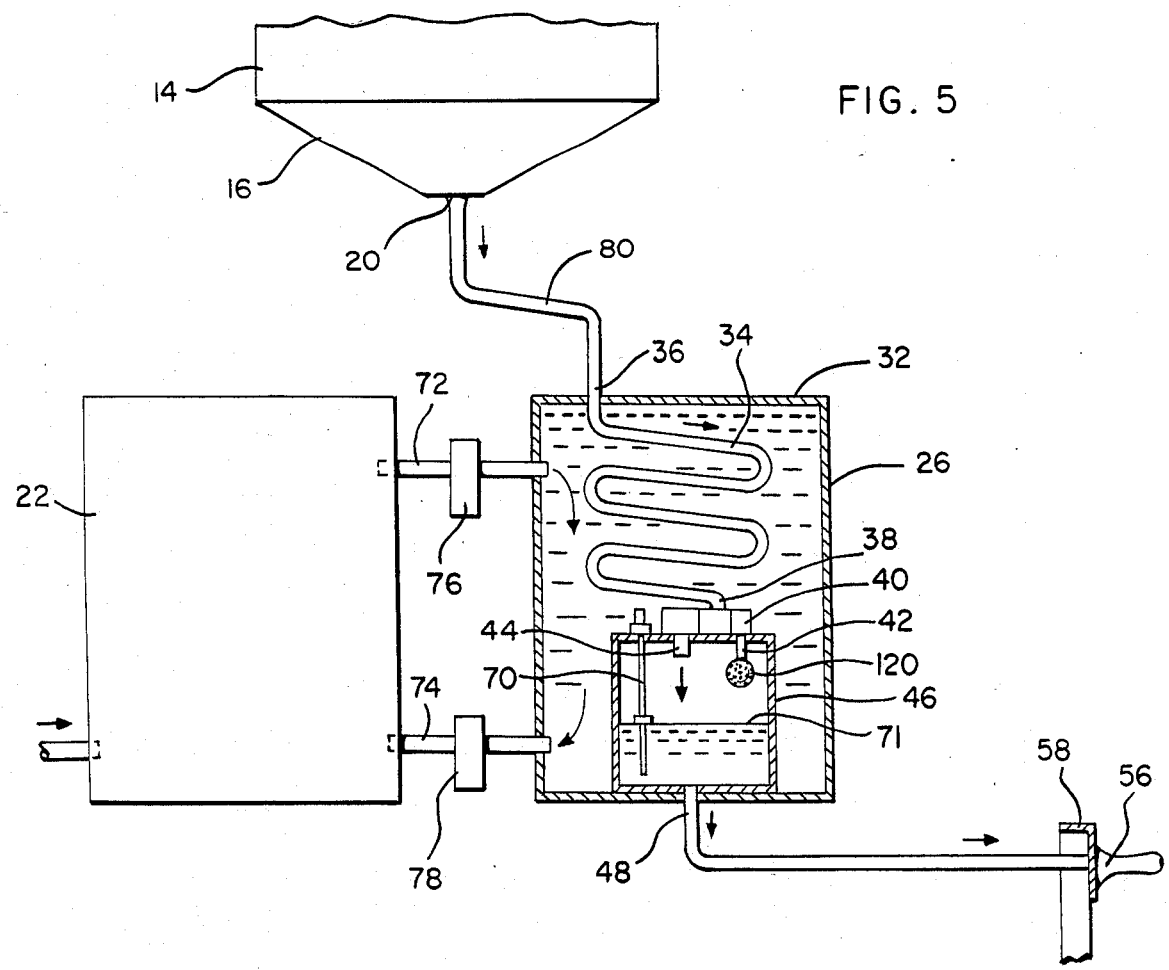
FIG. 5 is a schematic view illustrating the gravity flow of milk from the bulk supply tank thereof, through the warming tank, into the nipple supply tank and to one of the nipples and also illustrating the manner in which the temperature of liquid within the warming tank may be increased by convection flow of liquid from the hot tank therethrough.

Referring now more specifically to the drawings, the numeral 10 generally designates the calf feeding system of the instant invention. The system 10 includes a support rack referred to in general by the reference numeral 12. The rack 12 removably supports an upper bulk liquid receptacle 14 therefrom including an inverted conical bottom 16 having a central outlet 20 therefor. The rack 12 also removably supports a lower hot tank 22 and a lower warming tank 26 therefrom, the receptacle 14 including an openable lid portion 28 and the tanks 22 and 26 including removable lids 30 and 32, respectively.

The interior of the warming tank 26 includes a heat exchanger 34 including an inlet 36 opening through the lid 32 and the heat exchanger 34 includes an outlet 38 opening into a valve assembly 40 including first and second outlets 42 and 44 opening into the interior of a nipple milk supply tank 46 disposed within the warming tank 26. The supply tank 46 includes an outlet 48 opening through the dump line 50 and into a manifold 52 from which a plurality of supply lines 54 extend to an equal number of nipples 56 supported from a mount 58. The dump line 50 includes solenoid actuated valves 60 and 62 controlling the flow of fluid thereto upstream and downstream, respectively, from the point at which the outlet 48 opens through the dump line 50 and the outlet 48 includes a solenoid controlled valve 64 for controlling the flow of liquid therethrough downstream from the dump line 50.

The valve assembly 40 includes a solenoid actuated valve 66 for controlling the flow of liquid through the valve assembly 40 to the outlet 42 and a solenoid valve 68 for controlling the flow of liquid through the valve assembly 40 to the outlet 44. In addition, the nipple milk supply tank 46 includes a float switch assembly 70 for controlling the level 71 of milk therein and corresponding upper and lower portions of the tanks 22 and 26 are communicated by connecting pipes 72 and 74 having solenoid actuated flow controlling valves 76 and 78 serially connected therein. Also, a line 80 communicates the outlet 20 with the inlet 36.

The dump line 50 includes an outlet 81 and the inlet end of the dump line 80 is communicated with one end of a supply line 82 as at 84. The other end of the supply line 84 opens into the interior of the receptacle 14 through the lid 28 thereof and includes a spray discharge head 86 thereon within the receptacle 14. The line 82 includes an electrically actuated pump 88 serially connected therein and a sanitizing liquid injecting system 89 serially connected therein under the control of a solenoid valve 90. The sanitizing liquid injecting system 89 is disposed downstream from the pump 88 and the pump 88 is disposed downstream from one end of a delivery line 92 opening into the line 82 under the control of a solenoid valve 94. The end of the delivery line 92 remote from the solenoid valve 94 opens into the bottom of the hot tank 22 through a solenoid controlled valve 96. A main supply line 98 for water under pressure opens into the delivery line 92 intermediate the solenoid controlled valves 94 and 96.

A branch line 100 opens outwardly of the supply line 82 and inwardly of the lower end of the hot tank 22 and includes a solenoid actuated valve 102 serially connected therein. In addition, the hot tank 22 includes an electrical heater 104 under the control of a thermostat 106 and a float switch assembly 108 and a riser pipe 110 opening upwardly and outwardly from the lid 30 and including a vacuum breaker 112 and a pressure relief valve 114. Furthermore, the warming tank 26 includes an electrical heater 116 therein under the control of a thermostat 118 and the nipple milk supply tank 46 includes a spray discharge head 120 corresponding to the head 86 and mounted on the outlet 42.

The receptacle 14 includes a float switch assembly 124 and a journalled vertical shaft 126 selectively drivable by an electric motor 128 through a speed reduction gear assembly 130. The lower end of the shaft 126 includes paddle blades 132 and a refrigerant coil 134 is disposed in the lower portion of the interior of the receptacle 14. The coil 16 is supplied chilled refrigerant through a line 136.

A control assembly referred to in general by the reference numeral 138 is supported from the rack 12 and includes a run switch 140, a stop switch 142, an automatic timer control 144 and a time clock 146.

The receptacle 14 may be supplied fresh cow's milk, hospital milk, surplus milk, a milk replacer or any combination thereof. The receptacle 14 is of large capacity (55 gal.) and may be insulated, if desired. If the milk disposed within the receptacle 14 is of the type that must be refrigerated, the refrigerant coil 134 is utilized. However, the system 10 may be utilized in conjunction with a "stay-fresh" formula which may be stored at ambient temperatures.

Also, the tanks 22 and 26 may be insulated and the heater 104 within the tank 22 and the thermostat 106 are designed to maintain the temperature of the water within the tank 22 at approximately 180° F. Although the tank 26 includes an electric heater 116 and thermostat 118 as a backup, the water within the tank 26 is maintained in a heated state at approximately 90° F. to 150° F. by controlled convection circulation of water from the tank 22 through the tank 26 via the pipes or lines 72 and 74. Furthermore, the tank 46 is constructed of good heat transfer material and is disposed within the tank 26 and is therefore maintained at a temperature substantially equal to the temperature of the water within the tank 26.

In operation, a supply of milk is added to the receptacle 14 through the openable lid portion 28 after which the lid portion 28 is closed and latched in the closed position. The run switch 140 is then actuated. The motor 28 is intermittently operated by the control 144 to slowly turn the agitator blades 132 in order to prevent the butter fat content of the milk from separating and rising to the top of the level of milk within the receptacle 14. Furthermore, the milk passes from the bottom of the receptacle 14 through the outlet 20 and into the heat exchanger 34. Inasmuch as the water within the tank 26 is maintained in a heated condition, the milk flowing through the heat exchanger 34 is warmed to the same temperature and is admitted into the nipple supply tank through the outlet 44 under the control of the valve assembly 40. When the milk within the nipple supply tank reaches the level 72, the float switch assembly 70 actuates the valve assembly 40 to terminate admission of milk into the tank 46. Of course, when the milk within the tank 46 is at the level 72, the milk also flows from the outlet 48 to the solenoid controlled valve 64 which is initially closed, the solenoid valves 60 and 62 also being closed. After a predetermined time interval in order to allow the milk within the tank 46 to be fully warmed, the time clock 146 activates the solenoid valve 164 in order to open the same and the warm milk will flow into the manifold 52 and through the lines 54 to the nipples 56. Inasmuch as the nipples 56 are mounted at the proper height, calves may have free access thereto and be provided fresh, warm and fortified milk.

The warming tank 26 maintains the desired temperature of the milk flowing from the heat exchanger to the tank 46. If more heat is required as sensed by the thermostat 118, the solenoid valves 76 and 78 are opened whereby hot water from the hot tank 22 will flow by convection through the warming tank 26. In addition, the warming tank 26 includes a thermostatically controlled heater 116.

The temperature of water within the hot tank 22 is maintained through utilization of the thermostatically controlled heater and the proper water level is maintained within the hot tank 22 (above the pipe 72) by the float switch assembly 108 controlling the solenoid control valve 96.

When substantially all of the milk within the tank 46 has been depleted, the float switch assembly 70 closes to terminate operation of the system 10 in the feeding mode and to initiate the cleaning mode of operation thereof. The timer control 144 actuates the solenoid valve 94 allowing cold water to enter the line 82. The cold water passes upwardly through the line 82 and the pump 88 and is spray discharged into the receptacle 14 through the spray discharge head 86. Thus, the interior of the receptacle 14 is thoroughly rinsed. The rinse water then passes downwardly through the line or pipe 80, through the heat exchanger 34 and into the nipple supply tank 46 through the spray discharge head 120. At this time, the solenoid valve 62 is open and the rinse water is dumped from the discharge 81. The flow of rinse water through the receptacle 14 and tank 46 is continued until the timer control 144 terminates the rinsing operation. The timer control 144 thereafter actuates the solenoid valve 94 to close the same and opens the solenoid valve 102 and actuates the pump 88. In this manner, hot water from the tank 22 is discharged from the spray discharge head 86 into the receptacle 14 and the hot water passes through the system for a predetermined time to allow the system to become fully heated. Then, the timer control closes the solenoid valve 62.

After the solenoid valve 62 is closed hot water from the tank 22 begins to fill the receptacle 14 and the sanitizing liquid injection system 89 is actuated to allow a liquid wash and sanitizing concentrate to be injected into the hot water being pumped from the tank 22 into the receptacle 14. When the level of hot water within the receptacle 14 reaches a predetermined level, the float switch assembly 124 actuates the timer control 144 to close the solenoid valve 102 and open the solenoid valve 60 whereby the pump 88 will cause the hot water and cleaning and sanitizing concentrate to recirculate through the receptacle 14, the heat exchanger 34 and the tank 46 with the recirculating liquid being spray discharged into the tank 46 through the spray discharge head 120.

After a predetermined time, the time control 144 opens the solenoid valve 62 and closes the solenoid valve 60 as well as terminates operation of the pump 88. After a predetermined time interval, the timer control 144 will then close the solenoid valve 62 and the solenoid valve 96 will open to refill the tanks 22 and 26 with water. When the level of water within the tanks 22 and 26 reaches a predetermined minimum sensed by the float switch assembly 108, the solenoid valve 96 is closed and the heating elements 104 and 116 are actuated to heat the water in the tanks 22 and 26.

After the water within the tanks 22 and 26 has been heated, the solenoid valve 94 is opened and cool water is admitted into the receptacle 14 until a predetermined level of water has been sensed by the float switch assembly 124 after which the valve 94 is again closed. At this point, cool water flows from the receptacle 14 through the heat exchanger 34 and into the tank 46. This water is, of course, warmed and the timer control 144 may open the solenoid valves 64 so as to provide warm water to the nipples 56.

Also, the timer control 144 may actuate a signal (not shown) indicating that the sytem is again ready to be recharged with milk. When it is desired to recharge the system with milk, the solenoid valve 62 is opened to dump the water from the feeding part of the system and thereafter the valve 62 is closed. Then, the receptacle 14 may be recharged with a bulk quantity of nourishment supplemented milk and the feeding mode utilizing nourishment enriched millk may again be initiated.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A liquid nutrient animal feeding system including a liquid nutrient receptacle including means for admitting a supply of liquid nutrient thereinto and a liquid nutrient outlet, a warming tank, heat exchange means in said warming tank including inlet and oulet means, first conduit means communicating said liquid nutrient outlet with said heat exchange means inlet means, nipple means diposed exteriorly of said warming tank, second conduit means communicating said heat exchange means outlet with said nipple means, and first heating means operatively associated with said warming liquid tank for warming the liquid therein substantially to a predetermined temperature.

2. The feeding system of claim 1 wherein said receptacle and nipple means are disposed at elevations above and below, respectively, said warming tank for gravity flow of liquid nutrient from said supply receptacle, through said heat exchange means and to said nipple means.

3. The feeding system of claim 1 wherein said first heating means includes a hot tank at least generally horizontally registered with said warming tank and third and fourth conduit means communicating upper and lower portions, respectively, of said hot and warming tanks for convection flow of liquid between said hot and warming tanks, and valve means under the control of a thermostat sensing the temperature of liquid in said warming tank controlling the flow of liquid through at least one of said third and fourth conduit means.

4. The feeding system of claim 3 including second heating means operatively associated with said hot tank for heating the liquid in said hot tank to a predetermined temperature above the first mentioned predetermined temperature.

5. The heating system of claim 4 including liquid dump valve means operatively associated with said second conduit means for dumping liquid therefrom, said hot tank including a selectively actuatable outlet, a liquid spray outlet in said receptacle and selectively operable liquid transfer means operatively associated with said hot tank outlet and said liquid spray outlet for transferring heated liquid from said hot tank outlet to said liquid spray outlet under pressure.

6. The feeding system of claim 5 wherein said liquid transfer means includes injection means operable to inject sanitizing liquid into the liquid being transferred from said hot tank outlet to said liquid spray outlet.

7. The feeding system of claim 5 wherein said liquid transfer means includes means for receiving a supply of flushing liquid thereinto from a remote source of flushing liquid under pressure for discharge of said flushing liquid from said liquid spray outlet into said receptacle.

8. The feeding system of claim 4 including supplemental heating means operatively associated with said warming tank for controllably directly heating the liquid therein.

9. The feeding system of claim 1 wherien said warming tank includes a small volume liquid nutrient tank disposed therein for good heat transfer of heat from the warm liquid in said warming tank to said small volume liquid nutrient tank and the liquid nutrient disposed therein, said liquid nutrient tank being serially interposed in said second conduit means.

10. The feeding system of claim 9 wherein said second conduit means includes liquid nutrient inlet control valve means for said small volume liquid nutrient tank and means operative to control the gravity flow of liquid nutrient from said heat exchange means into said small volume liquid nutrient tank to maintain a predetermined level of liquid nutrient in said small volume liquid nutrient tank and thereby maintain a predetermined head pressure of liquid nutrient flow from said small volume liquid nutrient tank to said nipple means.

11. A liquid nutrient feeding sytem for animals including a large volume receptacle for containing a supply of liquid nutrient, a small volume tank disposed at an elevation below said receptacle, nipple means mounted at an elevation below said small volume tank, first conduit means communicating a lower portion of the interior of said receptacle with the interior of said small volume tank for gravity flow of liquid nutrient from said receptacle into said small volume tank, second conduit means communicating a lower portion of the interior of said small volume tank with said nipple means for gravity flow of liquid nutrient from said small volume tank to said nipple means, liquid level control means operatively associated with said small volume tank and first conduit means for controlling the gravity flow of liquid nutrient from said receptacle into said small volume tank to maintain a predetermined level of liquid nutrient in said small volume tank, said first conduit means including heating means operatively associated therewith for warming the liquid nutrient flowing therethrough substantially to a predetermined temperature, said heating means including a warming tank containing heat exchange liquid and heat exchange means in said warming tank serially connected in said first conduit means, a hot tank generally horizontally registered with said warming tank and containing heat exchange liquid therein, said hot tank including means for heating the heat exchange liquid therein, third and fourth conduit means communicating upper and lower portions, respectively, of said hot and warming tanks, and thermostat controlled valve means operatively associated with at least one of said third and fourth conduit means for opening said valve means to allow convection circulation of heat exchange liquid from said hot tank through said warming tank responsive to a drop in temperature of the heat exchange liquid in said warming tank below a predetermined minimum.

12. The feeding system of claim 11 wherein said small volume tank is disposed within said warming tank for heat exchange between the heat exchange liquid in said warming tank and the liquid nutrient in said small volume tank.

13. A liquid handling system including a large volume receptacle for containing a supply of liquid subject to spoilage at an elevated temperature, cooling means operatively associated with said recptacle for maintaining the liquid therein cooled to a temperature appreciably below said elevated temperature, a small volume tank disposed at an elevation spaced below said receptacle and including outlet means for dispensing warmed liquid from said small volume tank, first conduit means communicating the interior of said receptacle with the interior of said small volume tank for gravity flow of liquid from said receptacle into said small volume tank, liquid level control means operatively associated with said small volume tank and first conduit means for controlling the gravity flow of liquid from said receptacle into said small volume tank to maintain a predetermined level of liquid in said small volume tank, said first conduit means including heating means operatively associated therewith for warming the liquid flowing therethrough substantially to a predetermined temperature above said elevated temperature, said heating means including a warming tank disposed in heat transfer insulated relation with said large volume receptacle and containing heat exchange liquid and heat exchange means in said warming tank serially connected in said first conduit means, a hot tank generally horizontally registered with said warming tank and containing heat exchange liquid therein, said hot tank including means for heating the heat exchange liquid therein, second and third conduit means communicating upper and lower portions, respectively, of said hot and warming tanks, and thermostat controlled valve means operatively associated with at least one of said second and third conduit means for opening said valve means to allow convection circulation of heat exchange liquid from said hot tank through said warming tank responsive to a drop in temperature of the heat exchange liquid in said warming tank below a predetermined minimum.

14. The liquid handling system of claim 13 wherein said small volume tank is disposed within said warming tank for heat exchange between the heat exchange liquid in said warming tank and the liquid in said small volume tank.

* * * * *